(No Model.) 9 Sheets—Sheet 1.
G. CORSA.
TYPE MAKING MECHANISM.
No. 443,085. Patented Dec. 23, 1890.
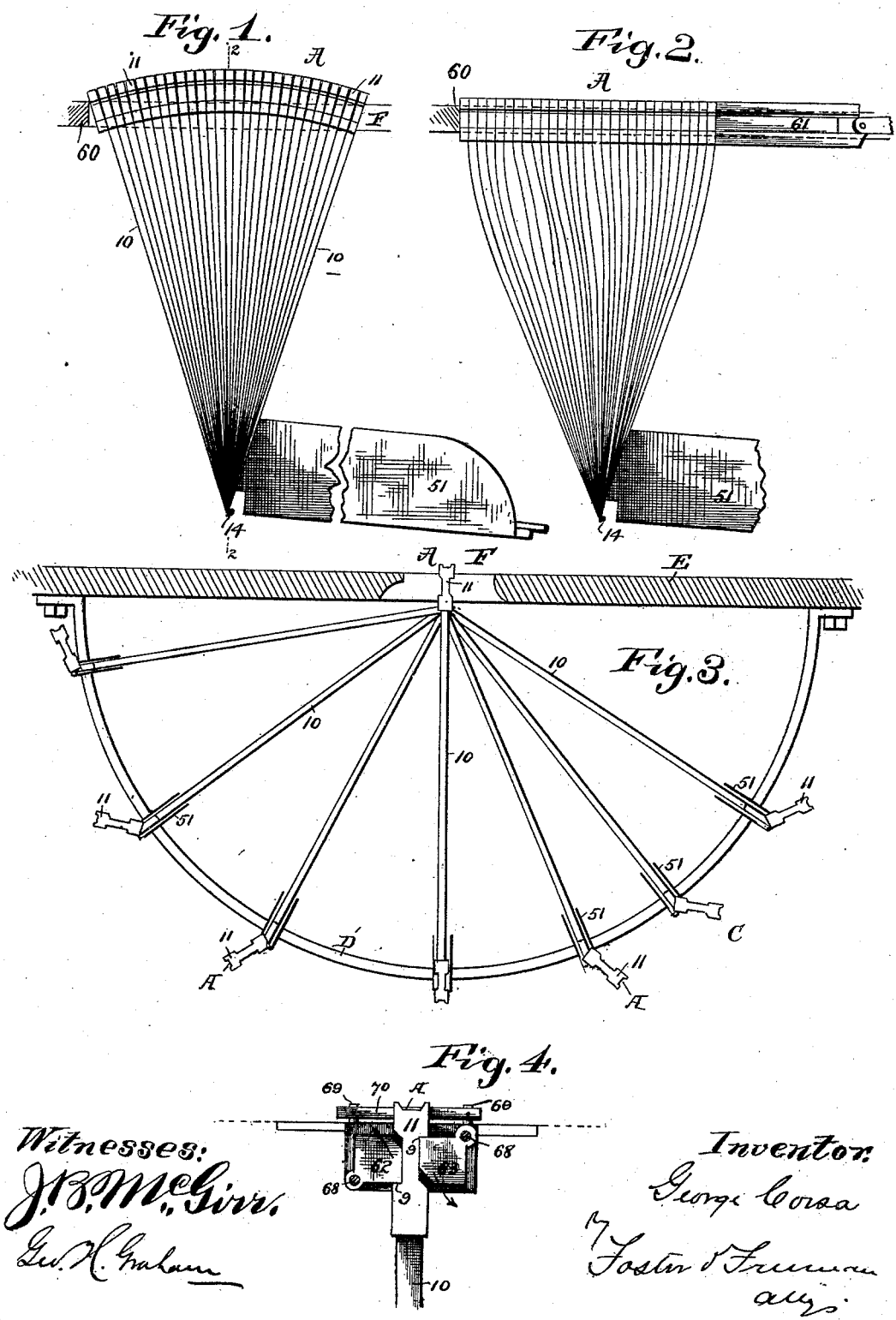

(No Model.) 9 Sheets—Sheet 2.
G. CORSA.
TYPE MAKING MECHANISM.
No. 443,085. Patented Dec. 23, 1890.
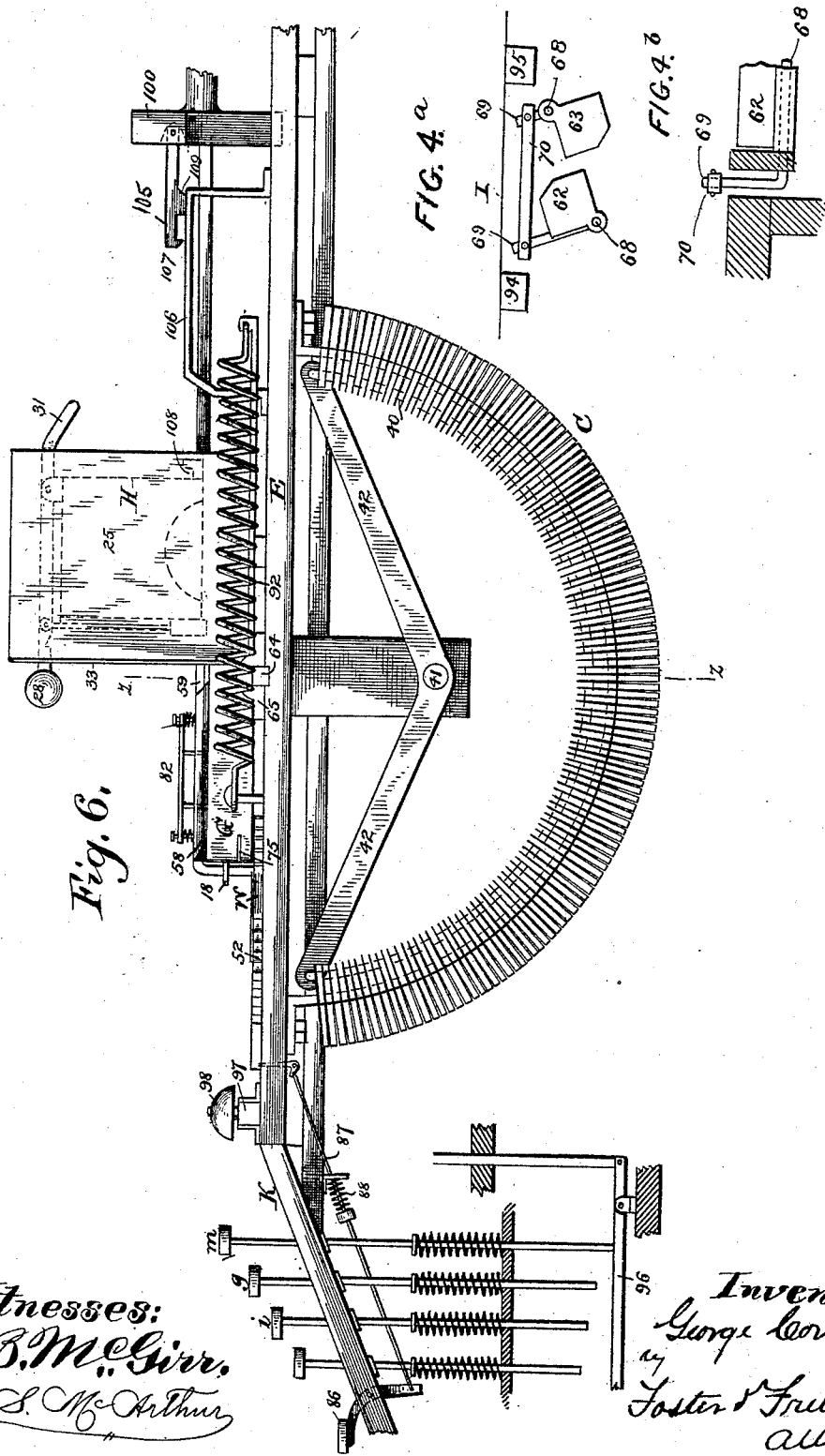

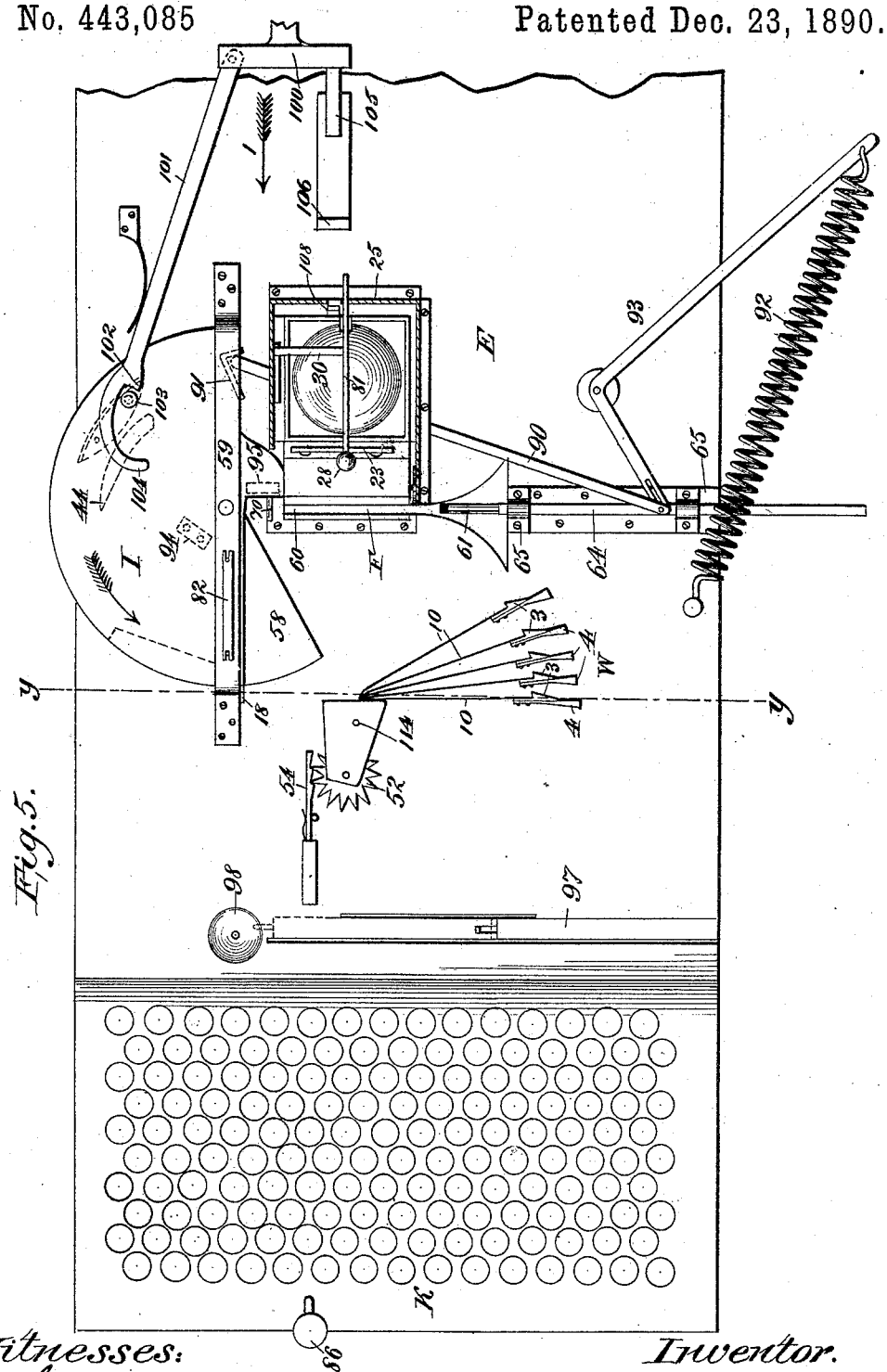

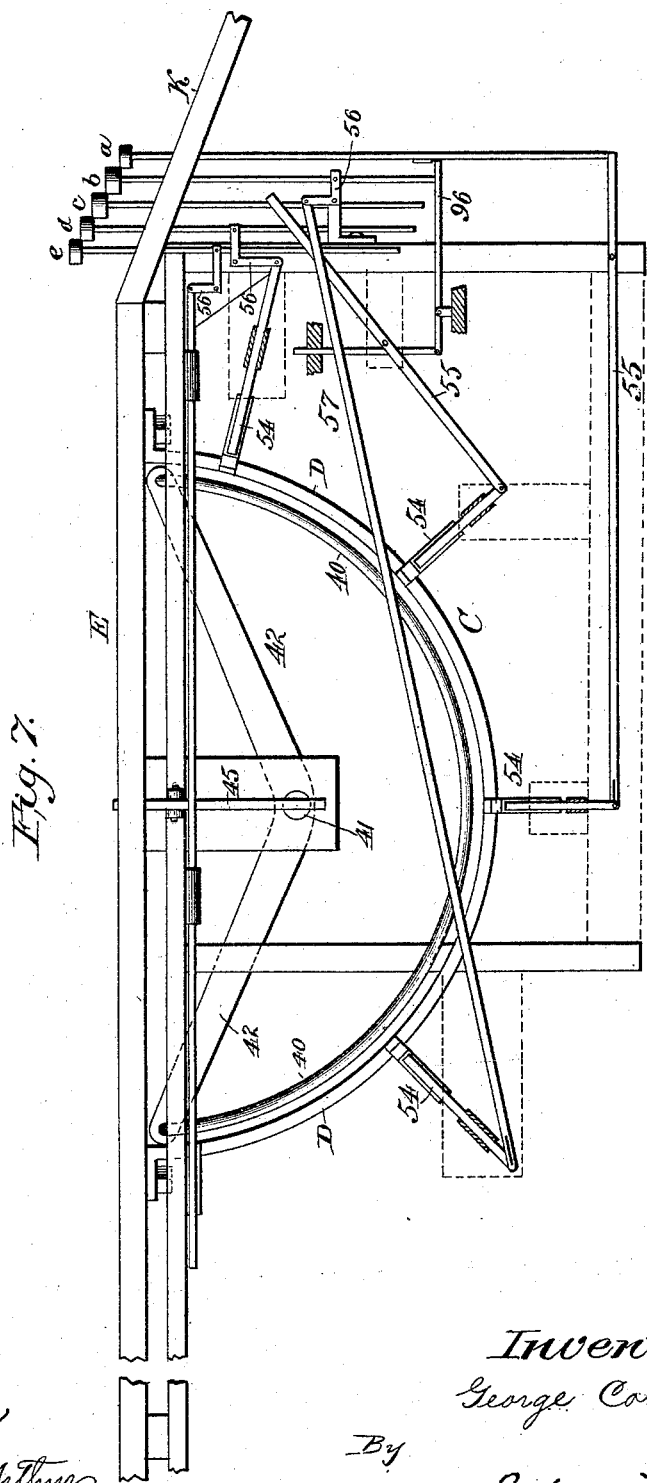

(No Model.)
G. CORSA.
TYPE MAKING MECHANISM.
No. 443,085. Patented Dec. 23, 1890.
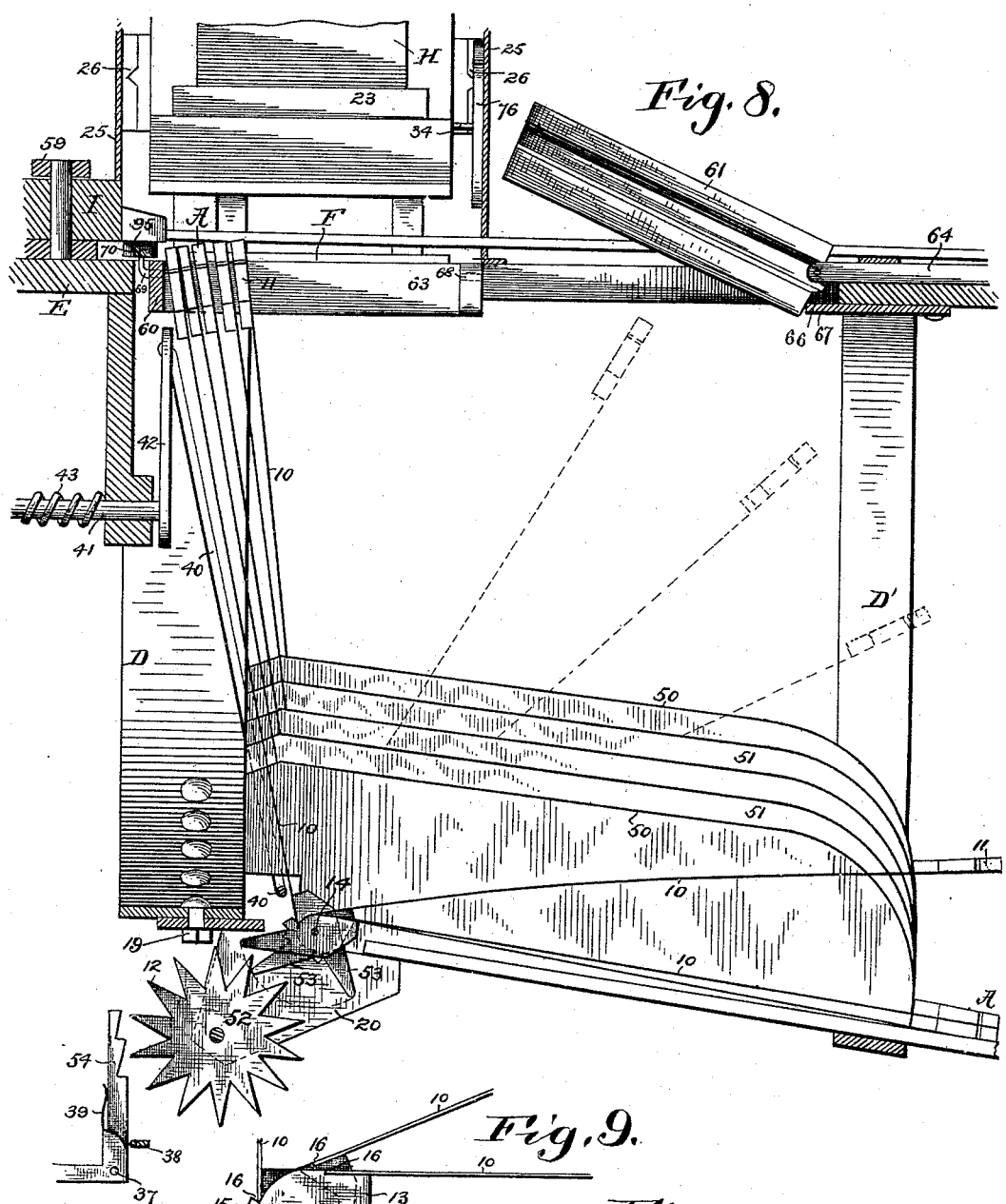
Witnesses:
J. B. McGivr.
W. S. McArthur.
Inventor:
George Corsa
by Foster & Freeman
Attys (No Model.)
G. CORSA.
TYPE MAKING MECHANISM.
No. 443,085. Patented Dec. 23, 1890.
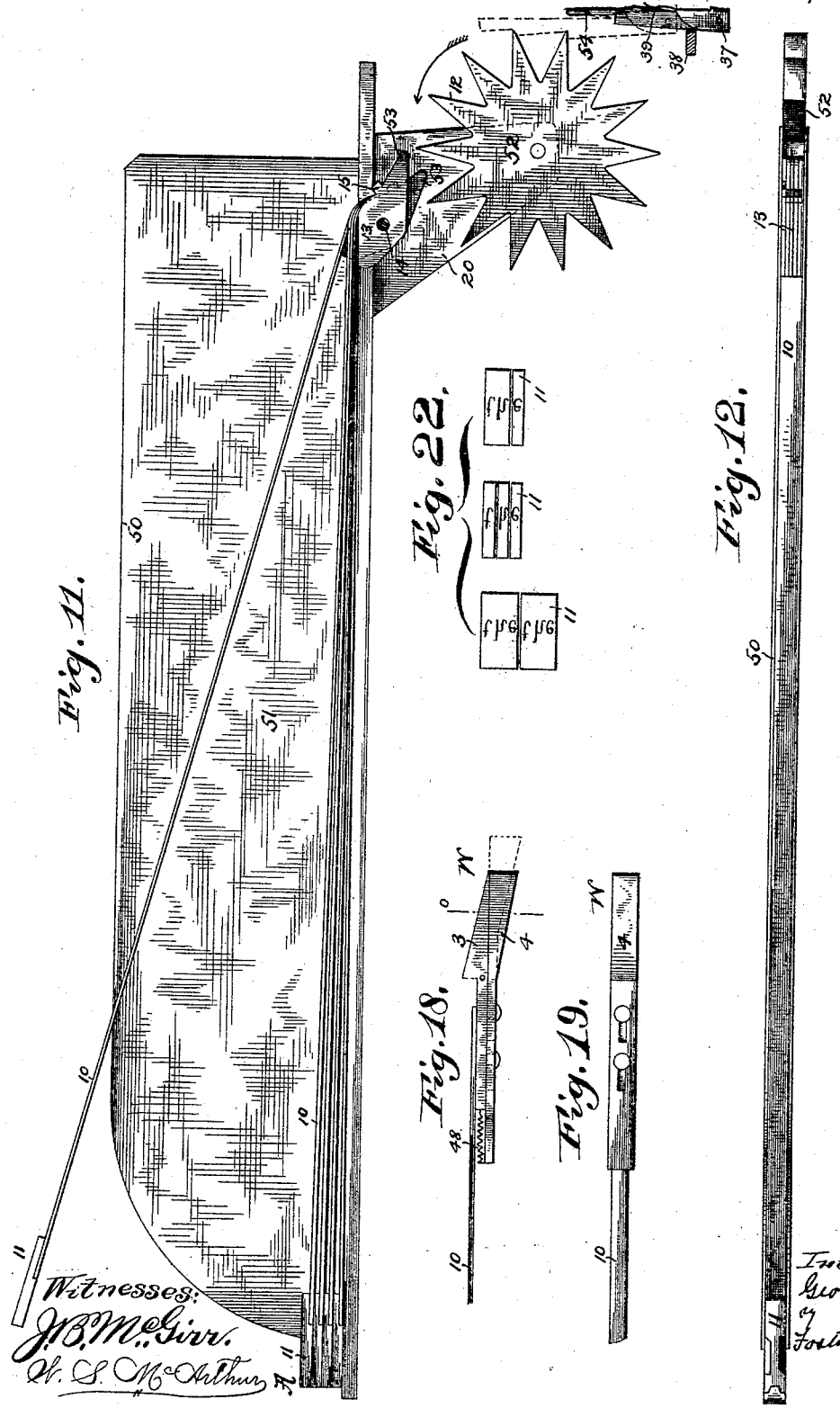

(No Model.)

G. CORSA.
TYPE MAKING MECHANISM.

No. 443,085. Patented Dec. 23, 1890.

Witnesses:
J. B. McGinn.
H. S. McArthur.

Inventor:
George Corsa
by Foster & Freeman
Attys (No Model.)
9 Sheets—Sheet 8.
G. CORSA.
TYPE MAKING MECHANISM.
No. 443,085.
Patented Dec. 23, 1890.
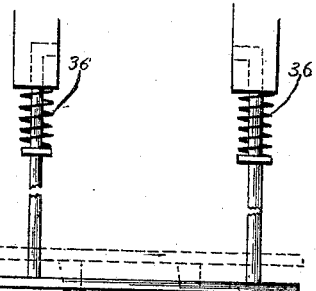
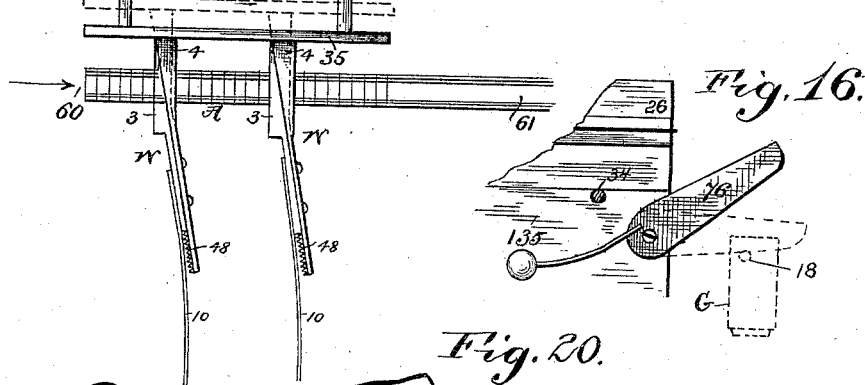
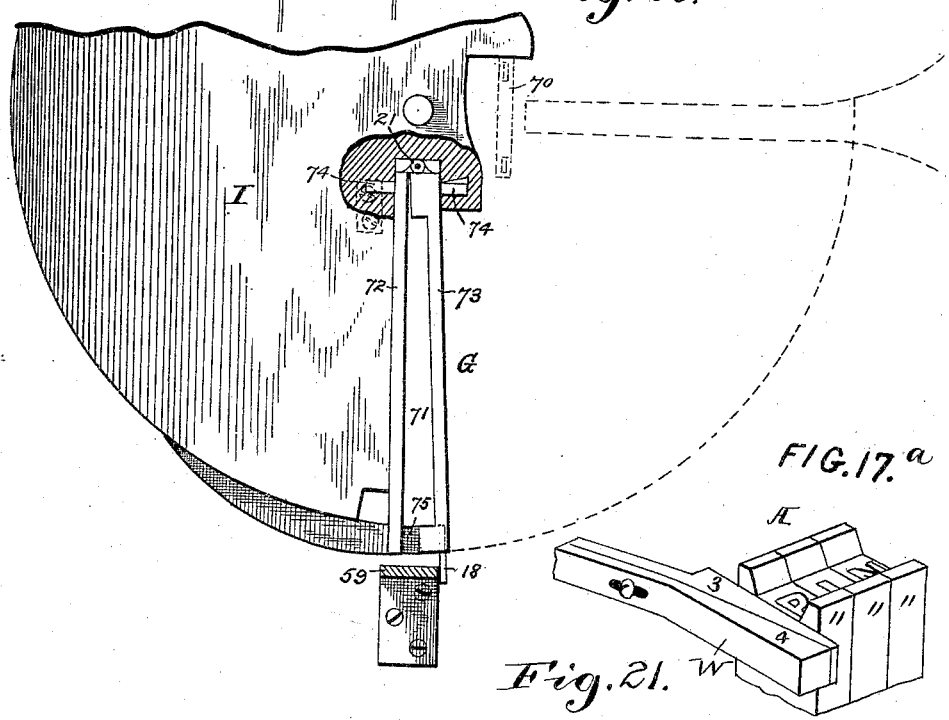
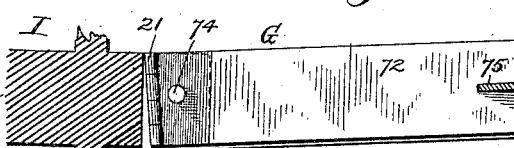
Witnesses:
J. B. McGirr.
N. S. McArthur
Inventor:
George Corsa
by Foster & Freeman
attys (No Model.) 9 Sheets—Sheet 9.

G. CORSA.
TYPE MAKING MECHANISM.

No. 443,085. Patented Dec. 23, 1890.

Witnesses:
J. B. McGinn.
H. S. McArthur

Inventor:
George Corsa
by Foster & Freeman
Att'ys

UNITED STATES PATENT OFFICE.

GEORGE CORSA, OF NEW YORK, N. Y.

TYPE-MAKING MECHANISM.

SPECIFICATION forming part of Letters Patent No. 443,085, dated December 23, 1890.

Application filed August 2, 1888. Serial No. 281,836. (No model.)

*To all whom it may concern:*

Be it known that I, GEORGE CORSA, a citizen of the United States, residing in the city, county, and State of New York, have invented certain new and useful Improvements in Machines for Setting Up Series of Matrices and Casting Therefrom, of which the following is a specification, reference being had to the accompanying drawings.
This invention relates to that class of devices that are adapted to set up a plurality of matrices, clamp them together adjacent to one end of a mold, usually "type-high," and into which mold and against the faces of the matrices a quantity of molten type-metal is poured or injected to form a line of connected characters corresponding with the matrices, that when removed from the mold is adapted to be set up, either alone or with other characters or types or similar connected characters, from which impressions may be taken; and it consists in the novel structure hereinafter fully set forth.

Figure 13:
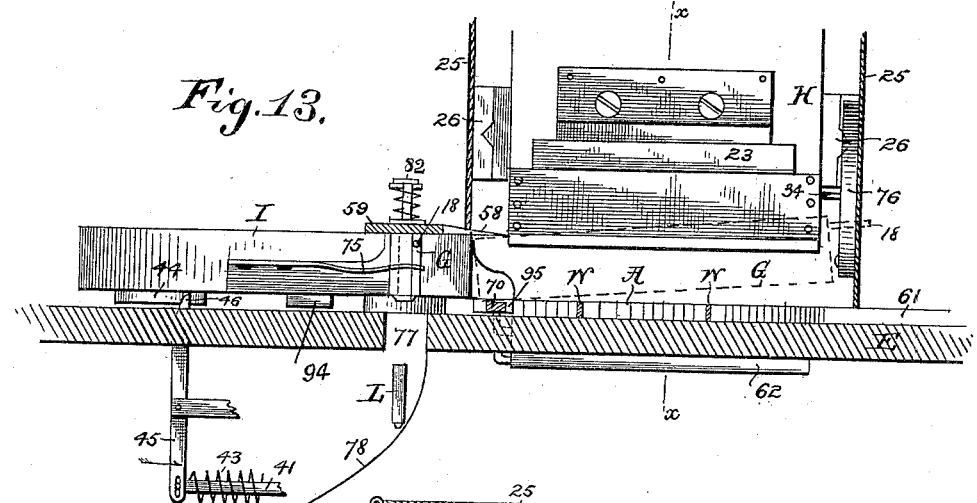
Figure 14:
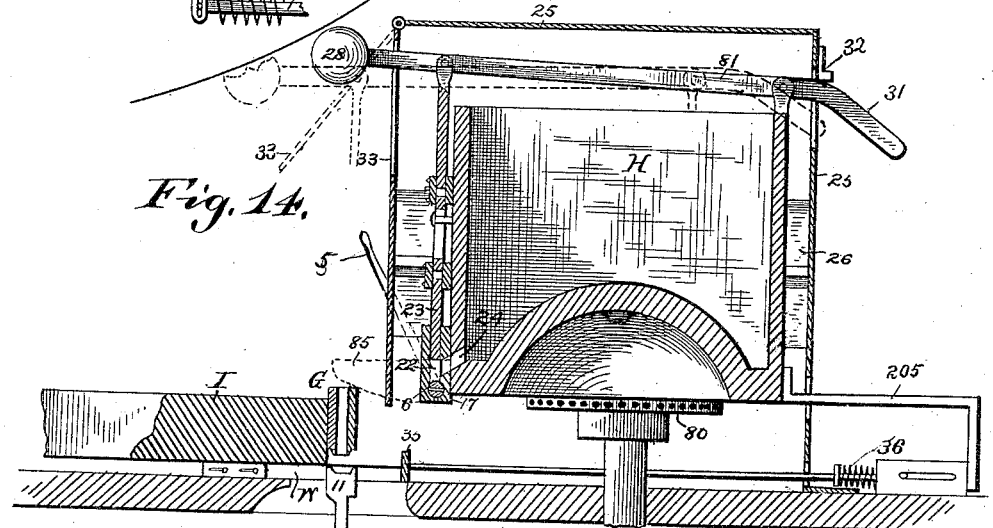
Figure 15:
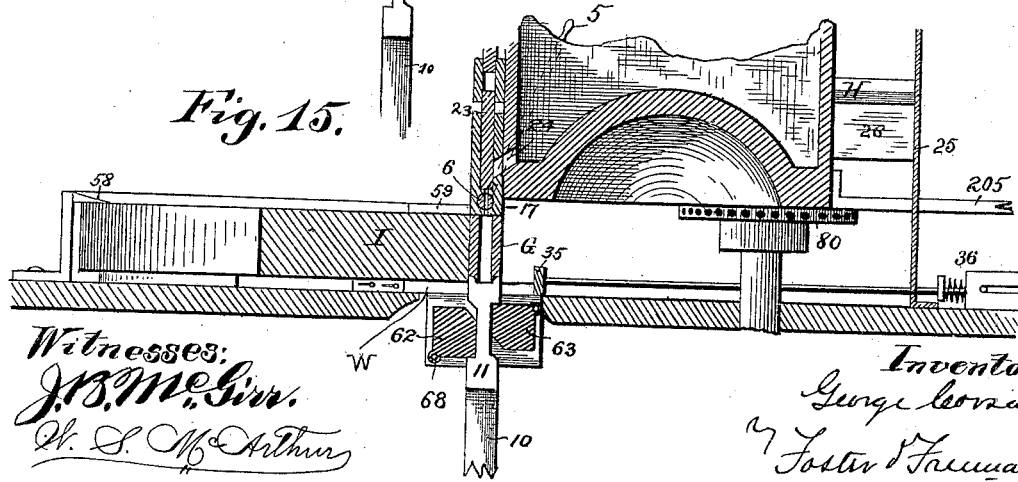
Figure 23:
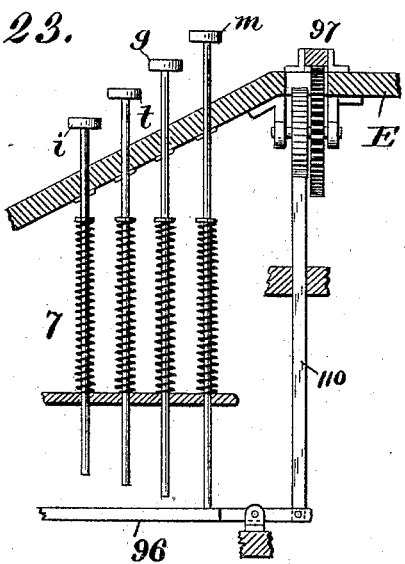
Figure 24:
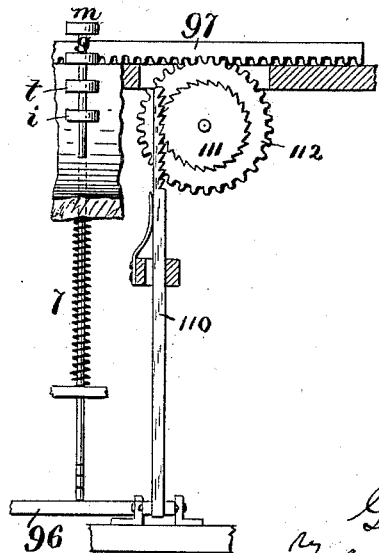

In the drawings, Figures 1, 2, 3, and 4 are diagrammatic views illustrating the function and operation of the main parts of the invention. Figs. 4$^a$ and 4$^b$ are detail views showing the operation of the side clamps. Fig. 5 is a plan view of a machine embodying the invention. Fig. 6 is a side elevation thereof. Fig. 7 is an opposite side elevation showing several connections between the matrix-elevating wheels and the keys. Fig 8 is an enlarged cross-sectional elevation taken on the line $z\ z$ of Fig. 6, showing particularly a number of matrices in their raised and normal positions. Figs. 9 and 10 are respectively side and plan views of a group of matrix-bars. Figs. 11 and 12 are respectively side and plan views of a group of matrices and matrix-bars and their supporting trough or pocket removed from the machine. Fig. 13 is a cross-sectional elevation taken on the line $y\ y$ of Fig. 5. Fig. 14 is a sectional elevation taken on the line $x\ x$ of Fig. 13, the carrier and its mold having been moved so that the latter is in its position over the matrices and the reservoir or melting-pot about to move forward to depress the mold in contact with the matrices; and Fig. 15 is a similar view of the same devices, the melting-pot being in position to eject the molten metal into the mold. Fig. 16 is a detail of the movable detent for effecting the depression of the mold.
Fig. 17 is a sectional plan view showing particularly the action of the justifying-spaces. Fig. 17$^a$ is an enlarged perspective view of a number of matrices and a space in their assembled position. Figs. 18 and 19 are respectively plan and side views of one of the justifying-spaces removed from the machine. Fig. 20 is a plan view, partly in section, of the carrier and its mold. Fig. 21 is a sectional elevation of a portion of the carrier and the mold, the latter being in its inclined or raised position; Fig. 22, views of the faces of several groups of matrices. Fig. 23 is a sectional detail of the means for operating and indicating strip 97, and Fig. 24 is a sectional front view of the same.

It is immaterial to the present invention whether cameo or intaglio characters be cut or impressed upon the matrices, and in the following specification I shall use the term "matrix" in a sense sufficiently broad to include both forms.

Before describing my invention in detail I will refer to the main parts and the manner in which they operate and co-operate to produce a continuous line of characters, and will afterward describe one means for imparting the desired movements of the many mechanisms which can be employed for securing such movements.

I employ a series of groups of independent matrices A, each matrix in the form of an oblong block or plate 11 with a character at the end, the matrices in each group bearing the same character, and in preparing the mold as many of the matrices are set up in a line as may be necessary to represent in succession the desired characters required to cast a continuous line of type representing a number of words or figures, and after the matrices are so arranged and secured in proper position a mold or box of proper shape is brought above the same and a quantity of molten metal is poured or injected into the mold thus formed by the mold or box and the faces of the matrices, after which the cast strip or connected line of characters is removed and the matrices are restored each to its place in connection with the others of the same group in the series.

Instead of carrying the matrices from the receptacles by the means of guides, as has been done, each matrix is secured to one end of a long thin flexible strip 10, Fig. 8, and the strips of each group of matrices representing the same character are secured at their opposite ends to or adjacent to the same pivot 14, and these pivots are arranged in a semicircular line below a table or platform E, having a central slot F, and each supporting-rod 10 is of such length and each matrix is secured to the said rod at such an angle that when the rod is turned up on its pivot 14 the matrix thereon will be carried into the slot F in a position at right angles to the plane of the surface of the table. Thus in Fig. 3 is represented diagrammatically a portion of the series necessary to complete the machine, and it will be seen that each of the rods 10, when carried to a position to hold its matrix in the slot F, occupies an angle to the said matrix different from that occupied by the other rods to the matrices with the same vertical position; but as each rod is radial to the slot F each matrix can be carried to the proper position in said slot by swinging each rod upon its pivot 14—in other words, the matrices and matrix-carriers in passing from their distributed to their assembled positions, and vice versa, swing in planes which intersect in a common line and pass through the pivotal points of the several carriers. The slot or receptacle for receiving and holding the assembled line of matrices is at or adjacent to the common line and parallel thereto. The pivots of the carriers are each approximately located in a plane passing through the middle of the slot or receptacle and at right angles to the common line. The carriers of an assembled line of matrices will also lie approximately in the same plane. It will be obvious that the carriers need not be all of the same length, but I prefer to make them uniform and to group the pivots in a semicircle below the table of the machine, as shown.

Each group of matrices representing the same character is supported by and in a narrow trough or pocket 51, Figs. 8, 11, and 12, and the series of troughs are carried by curved bars D D', secured beneath the table E and supporting the said troughs each in the plane of movement of its contained carriers, and preferably nearly parallel to the slot F. By thus arranging the pivot the matrices of the series will occupy different vertical positions in the slot F, accordingly as they are nearer to or farther from the central line 2 2 of Fig. 1. All of the rods 10 of the series are of such length that the first and the last of the matrices, when carried into the slot F, will be above the surface of the table, while the intermediate matrices will project to a greater extent above said surface, accordingly as they are located in the slot in a position nearer to the line 2 2. Inasmuch, however, as no effective printing block or strip can be made from the matrices thus arranged upon different levels, I employ means whereby all the matrices, after a sufficient number have been set up to form a line, are brought with their ends flush to each other upon the same plane, this being practicable in consequence of the flexible character of the rods 10, which bend, as shown in Fig. 2, when the matrices are forced downward to one plane. Different means for thus setting the different matrices to a level and for locking them as thus set may be employed. In Figs. 4 and 4ᵃ I have shown a leveling-clamp which is effective. In connection with this clamp, which consists of two jaws 62 63, each matrix has upon opposite sides shoulders 9 9, and the jaws are rotated upon axes 68 68, one rocking upward and the other rocking downward simultaneously, so that the edge of the jaw 62 will be brought upon the shoulders 9 upon one side of the matrices to depress all the latter to a uniform level, while the edge of the jaw 63 will be brought upward against the shoulder 9 upon the opposite side of the matrices and carry any of the latter which may have been unduly depressed up to the same level as the others.

Different means may be employed for bringing the matrices together for casting; but I prefer to employ a sliding clamp or follower 61, Figs. 5 and 8, having the same cross-section as the matrices, which, after a series of matrices has been set up in the slot F, is brought against the same and presses them together, each in a vertical position, the rods 10 bending or buckling to permit the matrices to take this position.

In order to justify the line after it is set up, I employ a series of justifying-wedges W, (see Fig. 5,) of any suitable construction, each connected to an arm or rod 10, similar to the rods carrying the matrices, and all pivoted to a vertical pivot 114 at the top of the table, so as to swing in a horizontal plane; and each one of these wedges is carried to a position across the slot F, after a number of matrices have been set up in line, to present their faces representing the characters in a single word or series of figures, and after the entire line is set up and the matrices are brought to proper vertical and horizontal position the wedges are operated so as to spread or contract the extent of the line until it is of proper length. A particular form of justifying-wedge will hereinafter be more fully described.

In connection with the appliances just above described I employ a casting apparatus of any suitable construction, one of which is illustrated and will be hereinafter more fully described.

With this understanding of the function and operation of the principal features of the invention, a detailed description will now be given of their construction and arrangement in an organized machine.

The matrices A, in the preferred construction, (see Figs. 3, 4, and 8,) are arranged adjacent to each other in a semicircular series C, having a center within the slotted opening F common to them all, so that when a number of matrices from separated or adjacent portions of the series are brought into their operative position their faces will lie approximately in line and in the same plane at the common center. The matrices are supported by semicircular bars or frames D, secured to the under side of the table E, and are preferably held in pockets 51, (see Figs. 8, 11, and 12,) secured to said frame by rivets or other suitable means, so that the extending side walls 50 thereof will separate the adjacent matrices, aid in steadying them as they are moved from and back to their normal positions, and insure their proper return. The matrix-pockets are preferably formed independent of each other, and as the matrices are movably mounted in the pockets any particular pocket and its matrix or matrices (if a plurality are used in a single pocket) may be removed at pleasure by loosening, for instance, its securing-bolt 19. The pockets are arranged substantially parallel with the table E, and may or may not be inclined, as shown, according to the size of the semicircular frames supporting them and the number of various characters it is desired the series should contain.

Each matrix consists of a matrix plate or block 11, Fig. 11, carrying on its face the desired character and secured to the end of a flexible bar or strip 10, (of thin steel or its equivalent,) the opposite end of which is mounted on a pivot 14, journaled between ears 20, with which the pockets are provided. As shown, the matrix-plate 11 is grooved on its end to provide a depressed face, in the bottom of which groove and in the depressed face the character is formed *in intaglio*. The inner vertical walls of the groove are slightly inclined to facilitate the proper seating of the mouth of the mold between the walls of the groove, as will hereinafter appear. When a plurality of matrices are in their assembled or operative position, it is obvious that the grooves in their ends will coincide and form a continuous one the length of the line of matrices. In the preferred form the pivotal end of the matrix-bar is secured to a plate 13, that is provided with a toe 53 for contact with an elevator 52, having connections with a key by which it is operated to move the matrix-bar and its matrix into operative position, as will hereinafter be more fully described.

The matrix-elevator consists, preferably, of a wheel provided with arms presenting numerous contacts 12 for contact with the toe 53 of the matrix-bar, which toe normally lies in the path of a contact, so that whenever the wheel is moved a step the toe will be rocked on the pivot 14 and its matrix and matrix-bar thereby moved from its normal position to bring the face of the matrix into its operative position, and as each of the matrix-bars in the series is independent there is provided an elevator-wheel 52 for each matrix-bar or group of bars, so that a matrix-bar and its matrix or those in any group may be moved independently of all the others.

In practice it will be necessary to provide duplicates of the matrices, so that if it is desired to use the same character more than once in the same line of characters moved into operative position for a single casting the machine will be capacitated therefor. The duplicated matrices may of course be arranged as the others are in the series, independent of the first matrix and in independent pockets; but for simplicity of construction and convenience of manipulation it has been found desirable to group the matrices having like characters together, so that the multiples thereof will lie one under the other, occupying in the series substantially the same position that a single matrix does.

In Figs. 8 and 11 there are represented, respectively, groups of four and five of duplicate matrices and matrix-bars in a single pocket adapted to be moved into operative position one at a time. In the construction shown the matrix-bars are superposed one upon the other, while their pivotal plates 13 are arranged side by side in like order upon a common pivot 14, as best shown in Figs. 9 and 10. The toe 53 of the uppermost matrix-bar of the group lies normally in the path of the contacts of the elevator-wheel 52, as indicated in Fig. 11, so that when the said elevator-wheel is rotated the foremost bar will be moved in operative position so as to place its matrix-plate in the slot F. (See Fig. 8.) In doing so, or just previous to arriving in such position, a shoulder 16, provided on all the bars of the group excepting the last one, will contact with a projection 15 on the adjacent and underlying bar—as, for instance, on its plate 13—so as to rock the toe of that bar downward into position shown in Fig. 9, to be contacted by the next contact of the elevator-wheel when it is again moved. Thus as each bar is moved to place its matrix in operative position the next and the then uppermost bar will have its toe moved into position for it to be struck by the next contact of the elevator, and so on until all the bars of the group have been moved; and that while the toe of such bar is in position to be contacted by the contact the toes of the other and underlying bars not moved will be out of the path of said contact, and hence only one bar will be moved at a time. It of course will be obvious that instead of duplicating the characters represented by the grouped matrices they may represent different characters—as, for instance, those that most frequently follow each other in making up a word, such as "ing" and "ty"— or they may be words such as "the" "and," or they may be contained by a single matrix, or the first two characters of such combinations may be contained by a single matrix and the third on a separate one, as shown in Fig. 22, so that a single movement of the elevator and of the actuating-key will move two characters or more into operative position, the third being in position to be moved if it be needed.

There is provided a key-board K, located at some convenient point for the operator, having a series of keys bearing designating-characters coinciding with their respective matrices in the series and suitably connected with the matrices, so that by depressing a key the desired matrix will be moved into operative position.

As before described, each of the matrices is moved by the movement of an elevator-wheel 52, and in order to effect this movement there is provided an operating-pawl 54, Figs. 8 and 11, that engages therewith, which pawl is so connected with a key corresponding to the matrix-bar to be moved that when such key is depressed the pawl 54 will be moved so as to rotate or partially rotate the elevator-wheel and thereby move a matrix-bar into operative position.

The connections between the pawl and a key may be electrical or mechanical devices, and may obviously be varied, as the position the key-board may occupy with respect to the matrix-bars is varied, and according to the varying positions the matrix-bars may occupy in the series. In Fig. 7 there are illustrated several different forms of such connections adapted to operate matrix-bars occupying as many different positions in the series. Thus, for instance, the keys $a$ and $c$ are connected to the ends of pivoted levers 55, the other ends of which levers are each connected with a pawl 54, while the keys $b$, $d$, and $e$ are connected to bell-cranks 56, which in turn are connected by rods 57 to their respective pawls 54.

The pawls 54 are pivotally mounted at 37 on their carrying levers and rods, so that in their idle position they will fall away from contact with the arms of the elevator-wheels 52. This movement of the pawl as it returns to its idle position after each impulse of the key may be aided by bearing against a contact 38, which occupies a position that permits the pawl, when operated by the key, to fall in the reverse direction to engage with the arms of the elevator-wheel, as in Fig. 8. This movement of course may be insured by providing a spring 39 to bear against the pawl, as shown.

The supporting-table E preferably extends over the series of matrices and their bars, the slotted or elongated opening F being coincident with the common center of the series, so as to permit the body of the matrix-plates 11 to pass into said opening as they and their bars are moved into operative position, with the faces of said matrices arranged adjacent to each other ready for the casting operation. The entrance end of the elongated opening F, Fig. 5, is gradually widened, so as to accommodate the passage of the matrices as they are moved up into position from different parts of the series. The opposite end of this elongated opening F is provided with a rigid abutment 60, Fig. 8, against which the initial matrix of those set up in one line will bear, and forming a rigid support for one end of the line of matrices as they are clamped by the devices to be presently described.

The matrix locking or clamping devices consist of an end clamp 61 and a pair of side clamps or jaws 62 63, Figs. 4, 4ᵃ 8, and 15, the said devices lying normally out of the path traversed by the matrices as they move to and from their operative position in the elongated opening F, but at the proper time are adapted to be automatically moved against the end and sides of the accumulated matrices to firmly secure them in place. The end clamp 61, Figs. 5 and 8, consists, substantially, of a sliding follower of about the size of a matrix-plate adapted to enter the end of the elongated opening F, and move up to and against the end of the accumulated matrices therein and clamp the same together between its end and the abutment 60; and in order to remove the follower from the path traversed by the matrices as they are moved to and from said elongated opening it is pivoted to a reciprocating bar 64, Fig. 5, held in suitable guides 65 on the table E, so that as the follower is moved back to its normal position its lower end will contact with a stationary abutment 67, and its forward end will be thereby raised into the position shown in Fig. 8. The lower side of the pivot of the follower may have a square shoulder or a suitable stop 66, adapted to contact with the under side of the reciprocating bar and sustain the follower in its horizontal position as it drops to that position in being moved forward away from the abutment 66.

In order to render the side or leveling clamps 62 63 more effective, the sides of the matrices are cut away, as indicated in Figs. 3, 4, 14, and 15, so as to provide shoulders 9 upon opposite sides of the matrix-plates, and as the shoulders are provided upon all the matrix-plates and bear the same relation to the face of the matrix the line of accumulated plates extending into the elongated opening F presents shoulders upon opposite sides, against which shoulders the side clamps may move, so that as the edge of each clamp contacts with the shoulder of the elevated or depressed matrix it will gradually move the same up or down until all are in absolutely the same line with their faces upon the same plane, and thus the matrices are also clamped firmly together and prevented from moving either upward or downward. These side or leveling clamps or jaws 62 63 extend upon opposite sides of the elongated opening F, and are mounted adjacent to said opening upon pivots or axes 68, which rest in bearings in the main frame, so that the jaws may rock in opposite directions, or, in other words, so that the jaw 62 may rock downward against the shoulders 9 upon its side of the matrix-plates, while the jaw 63 rocks upward against similar shoulders upon the opposite side of the matrix-plates. The pivot 68 of each of the jaws, after passing their bearings, are bent at right angles or provided with cranks 69, (see Fig. 4ᵇ,) that extend upward through an opening in the table E, and at their upper ends are connected by a rod 70, Figs. 4 and 8, by moving which said jaws are rocked simultaneously either to clamp the matrix-plates or to release them. The sliding end clamp or follower 61, Fig. 8, may be similarly provided upon its opposite sides with shoulders corresponding with those on the matrix-plates, or with recesses, so that should the end clamp extend between the side clamps it will be clamped into line therewith and not interfere with their operation.

The casting appliances consist, essentially, of a casting box or mold G, adapted to bear against the exposed faces of the matrix-plates, which then form one end of the mold, and a reservoir H of molten type-metal, adapted to inject or pour into the mold, against the faces of the matrix-plates, a suitable quantity of metal to cast a connected series of characters. The mold G will usually be type high, and in the preferred construction is adapted to move to and away from the opening F, in order to better deliver the casting out of the machine. As shown, the mold is supported by a carrier I, Fig. 5, that is adapted, as will presently appear, to vibrate back and forth between fixed limits, and thus carry the mold to and from the face of the matrices.

While the mold for all practicable purposes may provide simply an opening 71, (see Figs. 20 and 21,) corresponding to the size of the casting to be formed, it is preferred to form it of two parts 72 73, hinged together at 21 at one end and free to be moved apart to open the mold, and thus facilitate the removal or discharge of the casting formed therein. This opening of the mold is effected by a stud 18, carried by the part 73, which immediately before the carrier and mold arrive at their normal position (shown in Figs. 5 and 20) contacts with the bridge 59, stopping any further movement of the part 73. The mold is also preferably mounted in the carrier I through pivots 74, Figs. 20 and 21, located at one end of the mold and entering suitable sockets in the carrier and adapted to permit the mold to have a slight vertical movement. The free end of the mold is engaged by a spring 75, attached to the carrier, (see Fig. 13,) which normally holds it in its inclined or raised position. The effect of this is to permit the under portion or mouth of the mold to escape the grooves in the upper faces of the matrix-plates, so that it may freely move over them, and when brought into proper position is contacted by a detent 76, Fig. 16, that bears against the mold or the stud 18 carried thereby and moves it, so that its mouth is lowered within the groove, into contact with the faces of the matrices carrying the characters against the pressure of the spring 75 and holds it firmly in such position during the casting operation.

In the path traveled by the upper edge of the mold there is provided a knife or shaving edge 58, Figs. 5 and 13, shown as fixedly secured to the bridge-piece or bracket 59, supporting one pivot of the carrier I, and as the mold returns to its normal position after the casting operation and containing the casting-strip the upper edge of said strip will be drawn against the knife, so as to cause the latter to shave off the edge of the strip and make it perfectly level. This use of the knife is rendered all the more desirable owing to the character of the orifice of the reservoir, as will hereinafter appear.

Immediately under the mold when in its normal or idle position, Fig. 13, the table is provided with a discharge-opening 77, through which the cast strip L may be ejected from the mold and by a guide 78 directed in any suitable accessible position. While the described opening of the mold will generally be all that is needed to effect the discharge of the cast strip, there is provided an ejector 82, Figs. 5 and 13, mounted on the bracket 59, adapted to be moved down into the mold and against the casting and thus positively insure its discharge therefrom. As shown, the ejector is adapted to be operated by hand. It will, however, be obvious that I may connect it to the cam-shaft, so as to be operated mechanically at intervals, as other movable parts of the machine are operated.

The reservoir or melting-pot H is suitably supported in the machine, and is provided with a heating device, such as the burner 80, that may be connected with a gas or other hydrocarbon supply through suitable tubing. The bottom of the pot may be concave, as shown, or otherwise shaped to provide an additional heating-surface.

The melting-pot or reservoir is mounted to slide in ways 26, Figs. 8 and 13, supported by a casing 25, secured upon the table E, whereby the reservoir may have a reciprocating movement to place its eduction-orifice in proper position over the mold preparatory to the molten metal being injected therein and withdrawn therefrom after the mold has been filled. The eduction-orifice 17, Fig. 14, preferably consists of a series of small holes arranged closely together, so as to divide the metal passing into the mold into fine streams or jets. Between said orifice and a mouth 24 there is formed a chamber 22, Fig. 14, approximately the capacity of the mold, in which reciprocates a plunger or valve 23, which when raised allows a quantity of molten metal to flow into and fill said chamber and be forced out through said orifice when lowered for that purpose, at the same time cutting off further flow of metal past the mouth 24. This is quite an important feature in this class of devices in that it is difficult while not unduly heating the metal to keep it sufficiently heated until it has passed into the mold. To insure the cutting off of the further flow of molten metal past the orifices 17, there is provided a plug-cock 6, having an operating-lever 5, (see Figs. 14 and 15,) extending within the casing 25, an opening being left in the side of the latter to allow for the oscillation of the lever, either by hand or automatically. As the reservoir II is moved forward, the plug-cock will be oscillated to open the orifices 17, as in Fig. 15, and when the reservoir is moved rearward the cock is oscillated in the reverse direction to shut off said orifices.

Any suitable means may be employed for actuating the valve 23, either by hand or automatically. As shown in Fig. 14 it is operated by the lever 81, pivotally mounted on the reservoir and provided with a weighted end 28, passing freely through an opening in the casing 25. The lever is provided with an arm 30, Fig. 14, adapted to normally rest and slide upon a support or shoulder 27, fixed to the side of the casing. (See Fig. 5.) The support is of sufficient length to sustain the lever and the valve 23 in the position shown in Fig. 14, while the reservoir is being reciprocated until it reaches the position shown in Fig. 15, when the arm 30 passes beyond the support and the weighted end of the lever falls (see dotted lines) and pushes with it the valve and ejects the molten metal into the mold. On the return movement of the reservoir an incline 31 on the opposite end of the lever contacts with the under side of a projection 32 of the casing 25, thereby rocking the lever in the opposite direction, returning its arm 30 upon support 27 and raising the valve, ready for the next operation. In order to better confine the heat rising from the molten metal and from the burner, I prefer to entirely inclose the reservoir within the casing 25 and provide the latter with the hinged forward plate 33, that may be pushed to one side by the movement of the reservoir as it is reciprocated forward over the mold, thus considerably reducing the required size of such casing.

The detent 76, Fig. 16, heretofore referred to as being contacted by the mold as it arrives in position over the matrices, may obviously be supported in any convenient position, so as to effect the purpose described; but in the construction shown in Fig. 16 said detent is pivoted to the side of the casing 25, Fig. 8, in line with the moving reservoir II, so that as the reservoir is moved forward it will contact with the detent, as by a stud 34, Fig. 16, and rock it into contact with the said mold, or in position to be contacted thereby. Said detent may be returned to its normal position on the rearward movement of the reservoir by a counterbalancing-weight 135, as shown. It is obvious, however, that such detent may be substituted by a projection 85, secured to the reservoir, as shown in dotted lines, Fig. 14, and adapted to contact with the mold or its stud 18 in like manner as does the detent.

Any suitable mechanism may be employed to cause the various described instrumentalities to perform their operations in succession or automatically. That shown consists of a driven head 100, Fig. 5, mounted to reciprocate in suitable bearings provided in the machine and driven in any suitable manner. The head actuates an arm 101, the free end of which is provided with a shoulder 102, adapted to contact with a stud 103, projecting from the carrier I, whereby as the head is reciprocated in the direction of the arrow 1 the carrier will be correspondingly vibrated on its pivot to place its mold over the matrices. The arm 101 is also provided with a hooked end 104, which, as the head 100 is reciprocated in the reverse direction, said end will contact with the stud 103 and draw back the carrier to its normal position. The head is also provided with a second arm or projection 105, pivoted thereto, and as it moves forward is adapted to contact with the reservoir II, so as to move the latter to its position over the mold. The reverse movement of the reservoir is had by providing the end of the arm 105 with a shoulder or hooked end 107, Fig. 6, which, as the arm contacts with the reservoir, drops into engagement with a notch 108, provided on the reservoir, so that on the return movement of the head 100 the reservoir will be drawn back positively to its rearward position. During its idle movement the arm 105 rests through a projection 109, upon a fixed track-surface 106 on the table E, which sustains the free end of the arm in position to escape the notch 108; but as it contacts, or immediately before it contacts, with the reservoir the projection 109 passes off the track 106, permitting the arm to fall, its hooked end 107 engaging with the notch 108. On the return movement of the arm after the reservoir has been drawn to its rearward position the projection 109 contacts with the inclined end of the track, and as the arm continues its rearward movement it is raised, so as to free its hooked end from the notch, leaving the reservoir stationary until the return movement of the head 100. The extent of movement of the head 100 is more than sufficient to cause the carrier to vibrate to its operative position, and upon the latter arriving at said position the shoulder of the arm 101 will slip away from the stud 103, allowing the carrier to remain in said position and permitting the head to continue to move forward, so that its arm 105, which has preferably just contacted with the reservoir II, commences to move it forward as the carrier stops its movement. Upon the return movement of the head 100 the arm 105 will first draw back the reservoir away from over the mold G, when the hooked end 104 of the arm 101 will then be in position to contact with the stud 103 and vibrate the carrier and mold to their normal positions, (shown in Fig. 5,) and when in this latter position, it will be understood, if the head 100 be a continuously-operating one, there will be sufficient play between the shoulder and hooked end of the arm 101 to permit the carrier to remain at rest a period of time necessary to both distribute the line of matrices previously set up in the opening F and to enable the operator to set up another line. The movement of the carrier I also serves as the means for imparting motion to the clamp 61 through the medium of a rod 90, that is pivoted to the actuating-bar 64 at one end, and at its other end bears against a projection 91, secured upon the under side of the carrier. A spring 92, through the medium of a bell-crank 93, continually exerts pressure upon said rod 90 and upon the actuating-rod 64, so that as the carrier is vibrated in the direction of its arrow the bar 90 will be caused to follow the projection 91, and thereby actuate the clamp until it is arrested by abutting against the matrices set up in the opening F. The spring 92, it will be understood, is of sufficient power to cause the clamp to move the accumulated matrix-plates together, so that the latter will be brought to a substantially vertical position, as seen in Fig. 2. The carrier I is also provided with a contact 94, which as it is moved in the direction of its arrow, Figs. 4ª, 5, and 13, contacts with the end of the rod 70, connecting the ends of the cranks of the side clamps 62 63, thereby simultaneously rocking them, so as to firmly grip and level the matrices, as in Fig. 4, said contact continuing to bear against the rod 70 so long as the mold remains over the faces of the matrices. A second contact 95, Fig. 5, is provided upon the carrier, which upon the reverse motion of the latter contacts with the opposite end of the rod 70 and rocks the clamps simultaneously in the reverse direction, so as to loosen their hold upon the matrices, as in Fig. 4ª, and permit them to be distributed and returned to their normal positions. This distribution of the matrices after each casting operation is effected by means of a distributer 40, curved, as shown in Figs. 6, 7, and 8, so as to contact, when moved for that purpose, with all of the matrices in the series when in their raised or operative positions and return them to their normal positions. The movement of this distributer is had through a rod 41, Fig. 8, mounted in bearings in the machine and connected to the ends of the distributer 40 by means of arms 42, the said distributer-rod being kept in its normal position by a spring 43.

Any suitable means may be employed for automatically moving the distributer 40. As shown it is effected by the movement of the carrier I as it is returned to its normal position after the casting operation. (See Fig. 13.) For this purpose the carrier is provided with a contact or shoulder 44, Figs. 5 and 13, that as the carrier returns to its normal position engages with the end of a lever 45, pivoted to the frame of the machine, and at its opposite end connected with the rod 41, Fig. 13, thus rocking said lever in the direction of its arrow, moving the distributer against the matrix-bars and returning them to their normal position.

In order to permit the shoulder 44 of the carrier I to pass the end of the lever when moving to its operative position without operating the distributer, the forward end of said shoulder is pointed, as shown, so that the end of the lever 45 may pass to the inside thereof without being operated. The lever 45 is made flexible sidewise, so that it may pass the shoulder 44 and spring back, to be engaged by it on the reverse movement of the carrier. To permit this action of the distributer it is to be understood that the toes 53 of each of the matrix-bars will contact with the arms of the elevator-wheels 52 and reverse the movement of the latter, the actuating-pawls 54 being then in their normal or idle position, free from said arms of the elevator-wheels, as in Figs. 8 and 11.

In order to provide the necessary space between the words of a line, or, it may be, the letters of a word, I employ one or more justifying spaces or wedges W, that are adapted to be moved against a matrix when in its operative position, thus separating that matrix a suitable distance from the following matrix, or, it may be, to aid in adding to the end of a line of matrices to make a line of the required length. These spaces or wedges, like the matrix-plates, are mounted at the ends of flexible bars 10, that are pivoted at their opposite ends, and in like manner are moved by the contacts of the wheel 52, in the path of which project toes formed on the ends of the bars, so that upon each movement of said wheel a space will be moved into contact against a matrix extending in the elongated slot F. This movement of the wheel 52 is also effected by a pawl 54, operated by a key 86, that is pivoted, as shown in Fig. 6, and connected thereto by a rod 87, held in its normal position by a spring 88.

The spaces W are formed of two parts 3 and 4, Figs. 18 and 19, the former rigidly secured to the bar and the latter movable with respect thereto. In the preferred construction the abutting surfaces of the two parts are straight while the opposite exterior faces are inclined but parallel with each other, so that when the movable part 4 is in the position shown in dotted lines, Figs. 18 and 19, the width of the space on the line—say o—is small, but may be increased or diminished in size by moving the movable part back to its position in full lines or still farther outward. In order to effect this movement of the movable part of the spaces when they are interposed between the matrices in their operative position there is provided a contacting plate 35, Figs. 15 and 17, that is mounted so as to be moved up against the projecting ends of the parts 4, so as to move them inwardly, thus increasing their width between the matrices, or between a matrix and the end of the line, and as the spaces are adjusted simultaneously their width between the matrices will be substantially equal, and the ultimate spaces formed in the casting will correspond therewith. In practice the upper surface of the spaces W, when in position between the matrices, will be substantially level with the bottom of the groove in the top of the matrix-plates, as in Fig. 17ª, so that when the mold is in position the assembled matrices and spaces will form an unbroken bottom to the mold.

The contacting plate 35 may be moved from any operating part of the machine, but is shown, Fig. 14, as connected with the reservoir II by an arm 205, (see Fig. 14,) so as to be moved therewith. In order, however, that the adjustment of the justifying-spaces will be only sufficient to cause the line of matrices to completely fill the opening F between the abutment 60 and the end clamp 61, Fig. 8, the contacting plate 35 is mounted so as to yield slightly against the pressure of springs 36, Fig. 14. In practice these springs will have somewhat less strength than the spring 92, that presses the end clamp 61 against the matrices, so that their effect upon the plate 35 will be to cause it to move the movable part of the spaces until its further movement is counteracted by the force of the spring 92. This construction also permits the contacting plate to effect the justifying of the line of matrices before the orifice of the reservoir has arrived over the mold, so that the line is clamped and justified before the reservoir is in position to supply the molten metal to the mold. After the casting operation and the return of the contacting plate 35 to its normal position away from the ends of the spaces, and the end and leveling clamps have been withdrawn, the spaces will be returned to their normal position, as in Fig. 5. At the same time the matrices are returned by the action of the distributer. Any means may be employed for projecting or extending the movable parts 4 of the justifying spaces or wedges outward to their normal position when the pressure against them is released. There is shown a spring 48, Fig. 17, connected with the fixed part and the inner end of the movable part, that tends to effect its extension and diminish the thickness of the space, as will be readily understood.

Provision is also made for indicating the space occupied by the matrices as they are set up in line in the opening F, so that the operator may know when a sufficient number of matrices have been set up to properly make a line of the desired length. For this purpose each of the keys as they are depressed to set up a matrix is adapted to contact with an actuating-lever 96, common to them all, (see Figs. 23 and 24,) connected to move an indicating-strip 97 step by step, that may sound an alarm on a bell or other sounder 98, Fig. 5, when at the limit of any predetermined movement. As the width of the matrices will vary according to the characters carried by their faces, the distance to which the indicating-strip is moved at each step should correspond with varying widths of the matrices set up. To effect this it is designed that all the keys representing substantially the same-sized matrices shall contact with the lever 96 at an equal predetermined distance from its fulcrum, and all the keys representing substantially another size contact therewith at another predetermined distance from its fulcrum, and so on.

There is illustrated details of a mode of operating the indicating-strip 97 in connection with four series of keys, the series $i, t, g,$ and $m$. The series $m$, representing those matrices of the greatest width, contact with the lever 96 at a point nearest its fulcrum, and hence depress the lever the greatest distance, and through the medium of a toothed pawl 110, ratchet 111, and gear 112, engaging with a rack on the indicating-strip 97, move the latter a predetermined distance equivalent to the size of the matrix set up in operative position. The next and succeeding series of keys $g\ t\ i$ when depressed will contact with the lever 96 at greater distances from its fulcrum, and its depression being less a corresponding less movement of the indicating-strip will be effected. The keys will be returned to their normal position after being depressed by springs 7.

Without limiting myself to the precise construction and arrangement of parts shown, I claim—

1. The combination of a series of pivoted carrying-bars, each bearing a matrix and arranged to swing in planes which intersect in a common line, and a receptacle at the intersection to hold an assembled line of matrices, substantially as described.

2. The combination of a series of pivoted flexible carrying-bars, each bearing a matrix and arranged to swing in planes which intersect in a common line, and a receptacle at the intersection to hold an assembled line of matrices, substantially as described.

3. The combination, with a series of pivoted carrying-bars, each bearing a matrix and arranged to swing in planes which intersect in a common line, and a receptacle for holding an assembled line of matrices, of a series of keys and connections between the keys and carrying-bars, substantially as set forth.

4. The combination, with a series of pivoted carrying-bars, each bearing a matrix and arranged to swing in planes which intersect in a common line, and a receptacle for holding an assembled line of matrices, of a series of elevators for swinging the bars, a series of keys, and connections between the keys and the elevators, substantially as set forth.

5. In a machine for casting a continuous line of characters, the combination, with a melting-pot and a mold, of a series of pivoted bars, each bearing a matrix, a receptacle to hold an assembled line of matrices, and means for assembling the matrices within the receptacle, substantially as described.

6. In a machine for casting a line of characters, the combination, with a melting-pot and a mold, of a series of pivoted flexible bars, each bearing a matrix, a receptacle to hold an assembled line of matrices, and means for assembling the matrices within the receptacle, substantially as described.

7. The combination, with a series of pivoted carrying-bars, each bearing a matrix and arranged to swing in planes which intersect in a common line, of a curved support for the carrying-bars and a receptacle for holding an assembled line of matrices, substantially as described.

8. The combination, with a series of groups of pivoted matrix-carrying bars arranged to swing in planes which intersect in a common line, of a pocket or trough for each group of matrices, substantially as described.

9. The combination, with a series of groups of pivoted matrix-carrying bars arranged to swing in planes which intersect in a common line, and a receptacle for receiving and holding a line of matrices, of a series of stationary pivots, each pivot being common to all of the matrices of a group, substantially as described.

10. In a machine for casting a continuous line of characters, the combination of a plurality of flexible strips pivotally mounted at one end upon a common pivot and carrying at the opposite end matrices, an elevator adapted to rock the flexible strips and matrices into operative position independently of each other, a key, and connections between the latter and the elevator for moving the same, substantially as described.

11. In a machine for casting a continuous line of characters, the combination of a plurality of flexible strips carrying matrices at their ends and mounted at their opposite ends upon a common pivot, an elevator moving the flexible strips independently of each other, and co-operating and contacting shoulders provided on the flexible strips, whereby as one strip and matrix is moved into operative position by the elevator the succeeding strip and matrix is moved into position to be operated by the elevator, substantially as described.

12. In a machine for casting a continuous line of characters, the combination of a plurality of flexible strips having matrices at their ends, a plurality of pivotally-mounted plates, each connected with a flexible strip and having a projecting toe, an elevator-wheel for contacting with the toes of the plates for moving the strips and matrices into operative position, and co-operating and contacting shoulders provided on the plates and strips, whereby as one strip and matrix is moved into operative position by the elevator the succeeding strip and matrix is moved into position to be operated by the elevator, substantially as described.

13. In a machine for casting a continuous line of characters, the combination, with a mold and melting-pot, of a series of pivotally-mounted bars having matrices at their ends, said bars lying normally substantially in a horizontal position, a table having an opening into which the matrices are adapted to pass, a series of elevators adapted to move the matrices from their normal position into their operative position in the said opening, a series of keys, and connections between the said keys and elevators for moving the latter, substantially as described.

14. In a machine for casting a continuous line of characters, the combination of a series of matrices pivotally mounted in the machine, a curved frame for supporting said series of matrices in the arc of a circle and each matrix in substantially a horizontal position, a table having an opening into which the matrices are adapted to pass, a series of elevators, a series of keys, and connections between the latter and the elevators for moving the same, substantially as described.

15. The combination, with a series of groups of pivoted matrix-carrying bars arranged to swing in planes which intersect in a common line, of a corresponding series of elevators, each elevator being adapted to swing in succession all of the members of a group of carrying-bars, substantially as described.

16. The combination of a series of pivoted carrying-bars arranged to swing in planes which intersect in a common line, a series of matrices attached to said bars at various angles therewith, and a receptacle at the intersection for receiving and holding a line of matrices, substantially as described.

17. The combination of the matrices carried by flexible pivoted arms, each formed of a single piece of metal, a receiver into which a series of matrices may be brought side by side, and means for forcing the matrices back toward the pivots of the arms, thereby bending or buckling the arms and bringing the faces of the matrices into the same plane.

18. In a machine for casting a continuous line of characters, the combination of a series of pivotally-mounted flexible strips carrying matrices at their ends, a pair of leveling-clamps, means for moving the matrices between the clamps, and means for operating the clamps against the opposite sides of the matrices, whereby to bring the faces of the matrices perfectly level, substantially as described.

19. In a machine for casting a continuous line of characters, the combination of a series of pivotally-mounted flexible strips carrying matrices at their ends, a pair of leveling-clamps, means for moving the matrices between the clamps, an end clamp or follower adapted to bear against the line of accumulated matrices, and means for operating the leveling-clamps against the opposite sides of the matrices, whereby to bring the faces of the matrices perfectly level, substantially as described.

20. In a machine for casting a continuous line of characters, the combination of a series of pivotally-mounted flexible strips carrying matrices at their ends, a leveling-clamp consisting of a pair of pivotally-mounted jaws connected to move in unison, means for moving the matrices between the jaws, and a contact for operating the jaws and clamping the same against opposite sides of the matrices, whereby they bring the faces of the matrices perfectly level, substantially as described.

21. In a machine for casting a continuous line of characters, the combination of a series of pivotally-mounted flexible strips carrying matrices at their ends, a pair of leveling-clamps, means for moving the matrices between said clamps, and a mold or casting box adapted to extend from the faces of the matrices, substantially as described.

22. In a machine for casting a continuous line of characters, the combination of a series of pivotally-mounted flexible strips carrying matrices at their ends, a pair of leveling-clamps, means for moving the matrices between said clamps, and a horizontally-movable mold or casting box adapted to be moved to and from the faces of the matrices, substantially as described.

23. In a machine for casting a continuous line of characters, the combination of a series of matrices, clamps for clamping the matrices together and bringing their faces to the same plane, means for moving the matrices between the clamps, and an oscillating pivoted mold or casting box adapted to be rocked against the faces of the matrices, substantially as described.

24. In a machine for casting a continuous line of characters, the combination of a series of matrices, clamps for clamping the matrices together, means for moving the matrices between the clamps, a pivotally-mounted and horizontally-moving mold or casting box adapted to be moved to and from the faces of the matrices and to be rocked against the same, substantially as described.

25. In a machine for casting a continuous line of characters, the combination of a series of matrices, means for moving them into operative position, clamps for clamping the matrices together, a carrier, a mold or casting box pivotally mounted in said carrier and moving therewith, and a detent for rocking the mold against the faces of the matrices, substantially as described.

26. In a machine for casting a continuous line of characters, the combination of a series of matrices and means for moving them into operative position, clamps for clamping the matrices together, a carrier, a divided mold or casting box mounted in said carrier adapted to be moved against the faces of the matrices and away therefrom, and a stop for contacting with a portion of the mold to separate the divided portions thereof and open the mold, substantially as described.

27. In a machine for casting a continuous line of characters, the combination of a series of matrices, means for moving them into operative position, clamps for clamping the matrices together, a horizontally-reciprocating carrier, a mold or casting box pivotally mounted in the carrier, the said mold consisting of two parts or sections hinged together at one end and adapted to be moved apart at the other, and a detent for moving the mold into contact with the faces of the matrices, substantially as described.

28. In a machine for casting a continuous line of characters, the combination of a series of matrices, means for moving them into operative position, clamps for clamping the matrices together, a movable carrier having a mold or casting box mounted to move bodily therewith, devices connected with the mold-carrier for operating the clamps, a horizontally-reciprocating reservoir for the molten metal, and a valve for controlling the supply of metal to the mold, substantially as described.

29. In a machine for casting a continuous line of characters, the combination of a series of matrices, means for moving them into operative position, clamps for clamping the matrices together, a movable carrier having a mold or casting box mounted therein, and a contact carried by the carrier for operating the clamps, substantially as described.

30. In a machine for casting a continuous line of characters, the combination of a series of pivotally-mounted matrices, means for moving them into operative position, clamps for clamping the matrices together, a mold or casting box adapted to extend to the faces of the matrices, and a distributer for returning the matrices to their normal position, substantially as described.

31. In a machine for casting a continuous line of characters, the combination of a series of matrices, means for moving them into operative position, clamps for clamping the matrices together, a movable carrier having a mold or casting box mounted therein, a distributer for returning the matrices to their normal position, and a shoulder carried by the carrier for operating the distributer, substantially as described.

32. In a machine for casting a continuous line of characters, the combination of a series of matrices, means for moving them into operative position, clamps for clamping the matrices together, a movable carrier having a mold or casting box mounted therein, a distributer for returning the matrices to their normal position, a shoulder carried by the carrier, and a lever connected with the distributer and adapted to remain inoperative as the shoulder moves in one direction and to be rocked thereby to operate the distributer as it moves in the reverse direction, substantially as described.

33. In a machine for casting a continuous line of characters, the combination of a series of matrices, means for moving them into operative position in line, a plurality of movable justifying-spaces mounted at the ends of flexible bars or strips that are pivotally mounted at their opposite ends in a plane at right angles to the said matrices, means for moving the justifying-spaces into operative position, and a contacting plate for adjusting the spaces, substantially as described.

34. In a machine for casting a continuous line of characters, the combination of a series of matrices, means for moving them into operative position, a plurality of movable justifying-spaces mounted at the ends of pivoted bars or strips, said spaces consisting of fixed and movable wedge-shaped portions, means for moving the justifying-spaces into operative position, and a contacting plate for adjusting the spaces, substantially as described.

In testimony whereof I have signed my name to this specification in the presence of two subscribing witnesses.

GEORGE CORSA.

Witnesses:
ANTHONY GREF,
WM. A. POLLOCK.